US012165252B2

(12) United States Patent
Nemlekar et al.

(10) Patent No.: US 12,165,252 B2
(45) Date of Patent: *Dec. 10, 2024

(54) MULTI-ACCELERATOR COMPUTE DISPATCH

(71) Applicant: Advanced Micro Devices, Inc., Santa Clara, CA (US)

(72) Inventors: Milind N. Nemlekar, San Diego, CA (US); Maxim V. Kazakov, San Diego, CA (US); Prerit Dak, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/480,466

(22) Filed: Oct. 3, 2023

(65) Prior Publication Data

US 2024/0029336 A1 Jan. 25, 2024

Related U.S. Application Data

(63) Continuation of application No. 17/218,421, filed on Mar. 31, 2021, now Pat. No. 11,790,590.

(51) Int. Cl.
*G06T 15/00* (2011.01)
*G06F 9/54* (2006.01)
*G06T 15/80* (2011.01)

(52) U.S. Cl.
CPC ............ *G06T 15/005* (2013.01); *G06F 9/545* (2013.01); *G06T 15/80* (2013.01)

(58) Field of Classification Search
CPC ....... G06T 15/005; G06T 15/80; G06F 9/545; G06F 9/5038; G06F 2209/509; Y02D 10/00
See application file for complete search history.

(56) References Cited

U.S. PATENT DOCUMENTS

| | | | |
|---|---|---|---|
| 11,790,590 B2 * | 10/2023 | Nemlekar | G06F 9/545 345/522 |
| 2006/0225074 A1 | 10/2006 | Vaid et al. | |
| 2007/0113229 A1 | 5/2007 | Serghi et al. | |
| 2009/0154572 A1 | 6/2009 | Baik et al. | |
| 2011/0161976 A1 * | 6/2011 | Alexander | G06F 9/52 718/104 |
| 2015/0145871 A1 * | 5/2015 | Parker | G06F 9/45516 345/505 |
| 2019/0317802 A1 * | 10/2019 | Bachmutsky | G06F 9/5044 |
| 2020/0004602 A1 | 1/2020 | Pawlowski et al. | |
| 2020/0098160 A1 | 3/2020 | Havlir et al. | |
| 2021/0294648 A1 * | 9/2021 | Champigny | G06F 9/4881 |

FOREIGN PATENT DOCUMENTS

KR 1020090065398 A 6/2009

* cited by examiner

*Primary Examiner* — Said Broome
*Assistant Examiner* — Donna J. Ricks
(74) *Attorney, Agent, or Firm* — Volpe Koenig

(57) ABSTRACT

Techniques for executing computing work by a plurality of chiplets are provided. The techniques include assigning workgroups of a kernel dispatch packet to the chiplets; by each chiplet, executing the workgroups assigned to that chiplet; for each chiplet, upon completion of all workgroups assigned to that chiplet for the kernel dispatch packet, notifying the other chiplets of such completion; and upon completion of all workgroups of the kernel dispatch packet, notifying a client of such completion and proceeding to a subsequent kernel dispatch packet.

17 Claims, 5 Drawing Sheets

MULTI-ACCELERATOR COMPUTE DISPATCH

CROSS REFERENCE TO RELATED APPLICATIONS

This application is a continuation of U.S. patent application Ser. No. 17/218,421, filed on Mar. 31, 2021, which is incorporated by reference as if fully set forth herein.

BACKGROUND

General purpose compute shaders are an increasingly popular way to execute highly parallelizable workloads. Improvements to general purpose compute shaders are constantly being made.

BRIEF DESCRIPTION OF THE DRAWINGS

A more detailed understanding can be had from the following description, given by way of example in conjunction with the accompanying drawings wherein.

DETAILED DESCRIPTION

Techniques for executing computing work by a plurality of chiplets are provided. The techniques include assigning workgroups of a kernel dispatch packet to the chiplets; by each chiplet, executing the workgroups assigned to that chiplet; for each chiplet, upon completion of all workgroups assigned to that chiplet for the kernel dispatch packet, notifying the other chiplets of such completion; and upon completion of all workgroups of the kernel dispatch packet, notifying a client of such completion and proceeding to a subsequent kernel dispatch packet.

Figure 1:
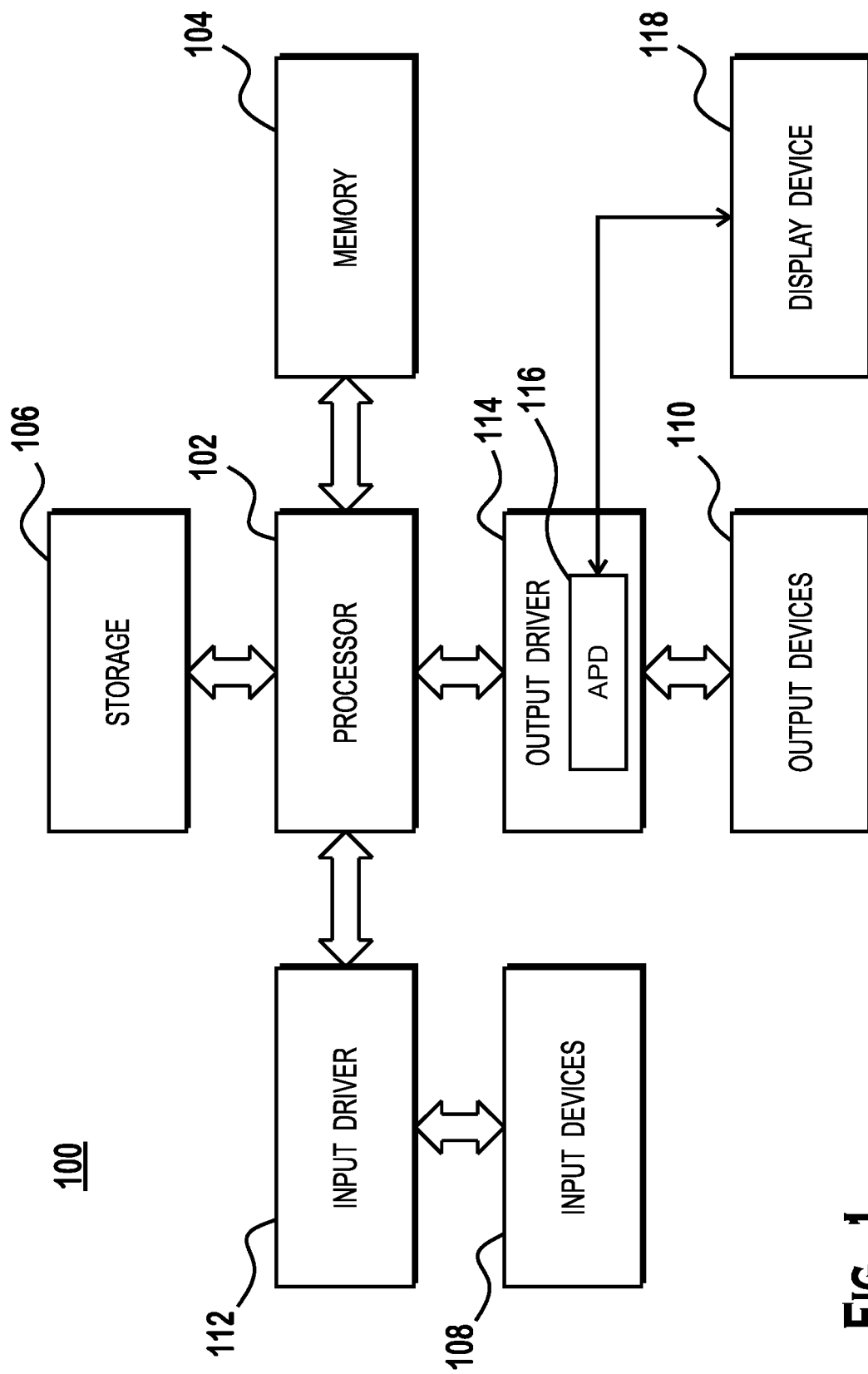
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and, in some implementations, graphics rendering commands from processor 102, processes those commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
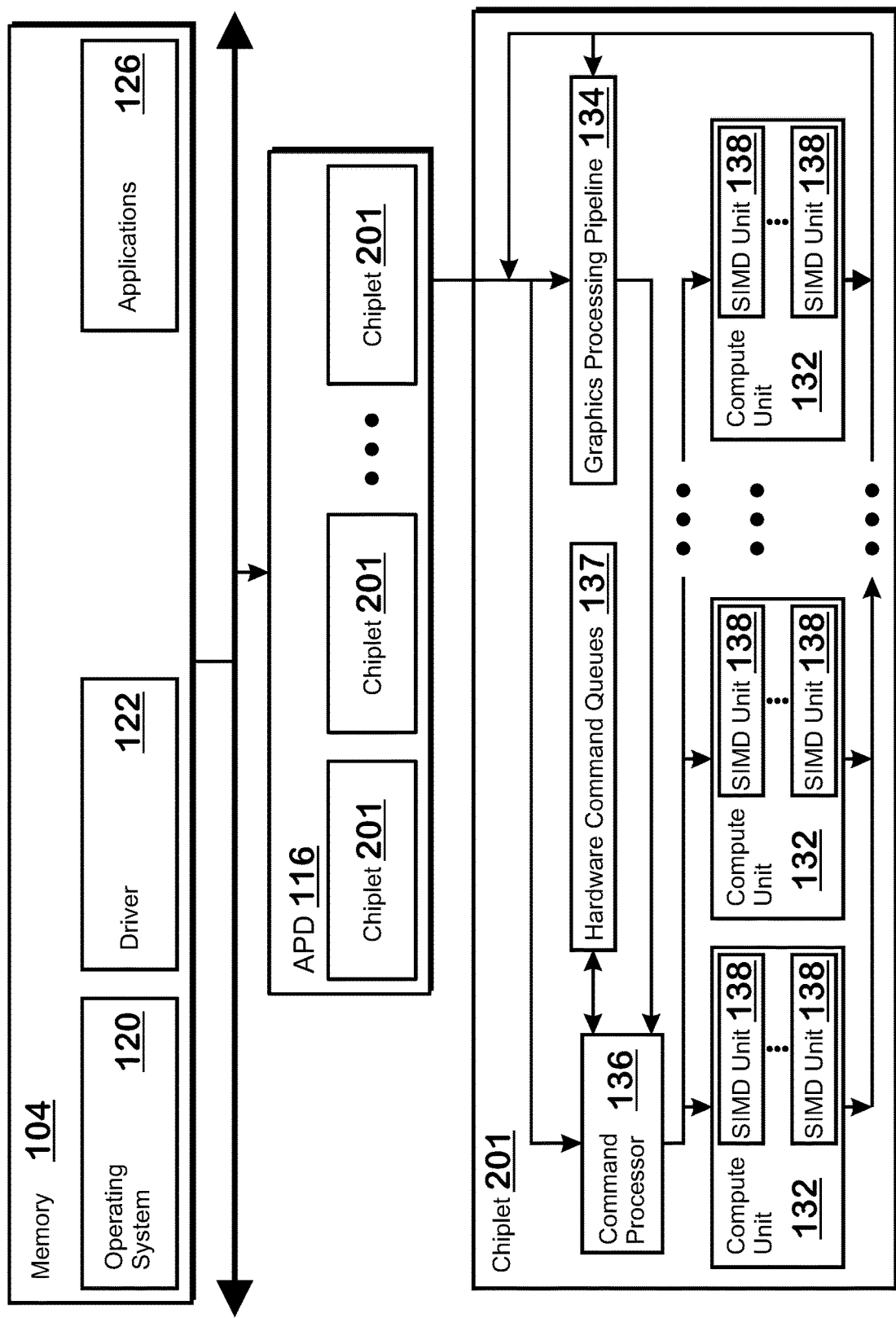
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes a plurality of chiplets 201. Each chiplet 201 is an instance of processing hardware as illustrated. In some implementations, the APD 116 is a processing device in which the multiple chiplets 201 reside.

Each chiplet 201 includes one or more compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A command processor 136 performs operations related to scheduling various workgroups on different compute units 132 and SIMD units 138. In general, the command processors 136 receive commands from an entity such as the processor 102, where the commands instruct the chiplets 201 to perform tasks such as graphics rendering, executing general purpose shaders, or the like.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Although the APD 116 has been described as including a graphics processing pipeline 134 being capable of performing graphics operations, the present disclosure contemplates implementations in which the APD 116 does not include a graphics processing pipeline 134. In such implementations, the APD 116 includes at least the compute units 132 and the command processor 136. The command processor 136 instructs the compute units 132 to execute general purpose computing shader programs, but does not control processing through a graphics processing pipeline.

Each chiplet 201 includes one or more hardware command queues 137 which store commands (sometimes referred to as "packets") from a host such as the processor 102. In an example, the processor 102 writes commands into a software command queue (not shown) and indicates to the APD 116 that these commands have been written. In response to this indication, the APD 116 loads the commands into one or more hardware command queues 137 and executes those commands.

Some commands include instructions to execute a compute shader. A compute shader is a general purpose shader program that executes on one or more compute units 132. Compute shaders are sometimes referred to herein as "kernels," "compute kernels," or "compute shader kernels." Commands to execute compute shader kernels are sometimes referred to herein as "kernel packets" or "compute shader packets." An execution of a compute shader program in response to a kernel packet is sometimes referred to herein as a "compute shader dispatch" or a "kernel dispatch."

A compute shader packet specifies the "size" of the kernel dispatch. The size refers to the number of work-items of the kernel dispatch. In some examples, the compute shader packet also indicates the number of workgroups for the kernel dispatch, while in other examples, information other than the compute shader packet indicates the number of workgroups for the kernel dispatch. Execution of the kernel dispatch includes executing all of the work-items (and thus workgroups) for the kernel dispatch.

The APD 116 executes the commands of a hardware command queue 137 in order. Thus the APD 116 executes a first command, then a second command, and so on. The chiplets 201 each traverse through at least some of the same commands of a particular software command queue. More specifically, for any particular software command queue, each of the chiplets 201 that cooperate together to execute the commands of that software command queue place the commands into the different hardware command queues 137 of the chiplets 201. The chiplets 201 cooperate to execute the commands of the hardware command queue 137. More specifically, the chiplets 201 divide the workgroups of a kernel packet for execution. Each chiplet 201 executes the workgroups assigned to that chiplet 201, but not workgroups assigned to other chiplets 201. A chiplet 201 is considered to be "complete" with a particular kernel packet upon completing all workgroups for that packet assigned to that chiplet 201.

Figure 3:
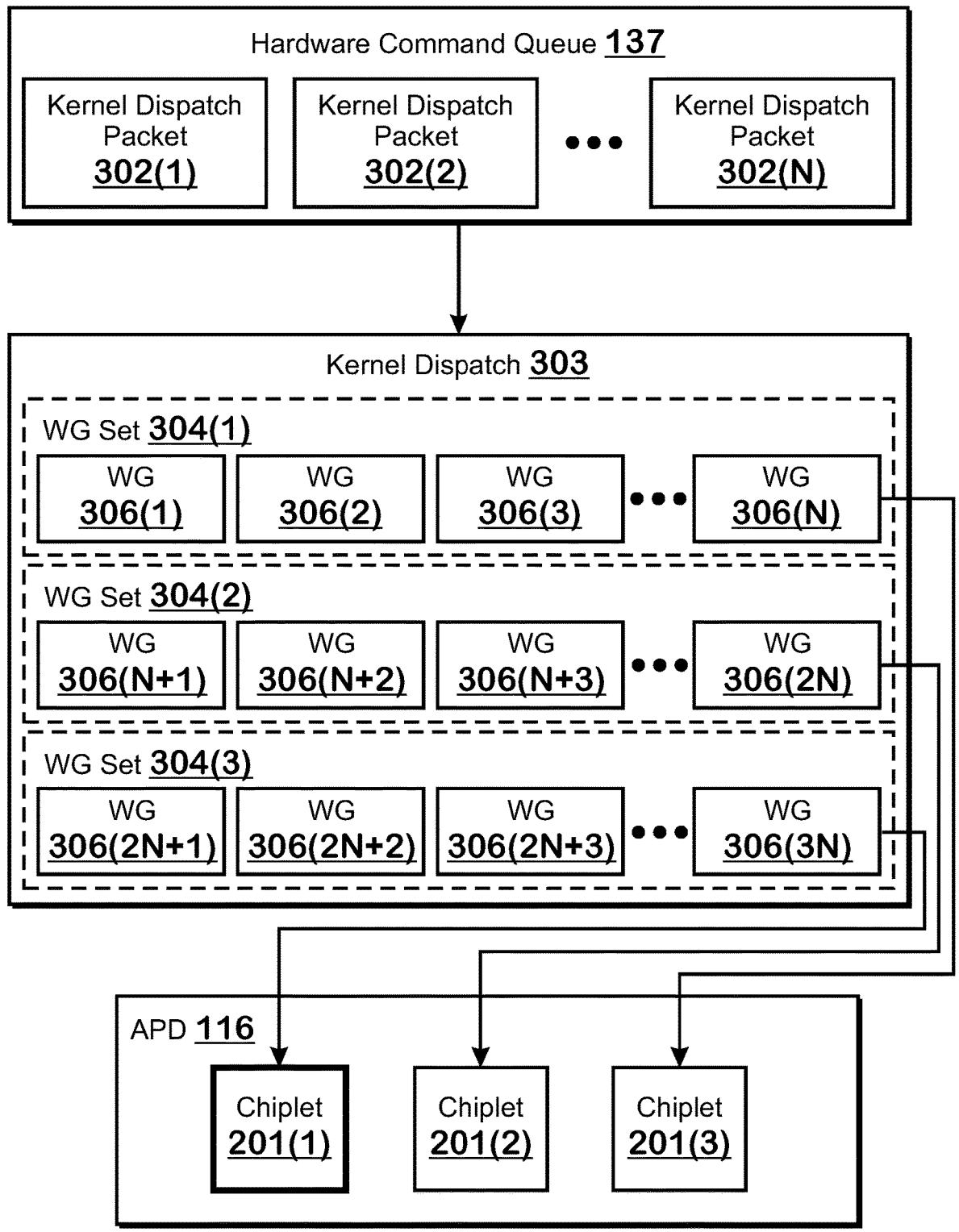
FIG. 3 is a block diagram of aspects of the accelerated processing device illustrating execution of commands of a command queue by multiple chiplets, according to an example.

FIG. 3 is a block diagram of aspects of the APD 116 illustrating execution of commands of a command queue by multiple chiplets 201, according to an example. A hardware command queue 137 is illustrated. The hardware command queue 137 stores kernel dispatch packets 302 for execution. As described elsewhere herein, multiple chiplets 201 "mirror" (store the same contents) a single software queue into their respective hardware command queues 137. Thus, these different chiplets 201 store the same kernel dispatch packets 302 in their respective hardware command queues 137.

The chiplets 201 cooperate to execute the kernel dispatch packets 302 by dividing the workgroups between the chiplets 201. More specifically, upon determining that a particular kernel dispatch packet 302 is to be executed, the command processors 136 in multiple chiplets 201 determine which workgroups 306 are to be assigned for execution to the different chiplets 201. The different chiplets 201 then execute the workgroups 306 assigned to those chiplets. For any particular chiplet 201, a kernel dispatch is complete when all workgroups 306 assigned to that chiplet 201 from that kernel dispatch are completed by that chiplet 201. For the APD 116, a kernel dispatch is complete when all workgroups 306 for that kernel dispatch are complete, which is also when all chiplets 201 to which workgroups 306 have been assigned have completed execution of those assigned workgroups.

Division of work of kernel dispatches to different chiplets 201 in this manner allows for the processing resources devoted to execution of workgroups to easily be scaled without requiring a programmer (such as a programmer writing software for execution on the processor 102) to know about or address this scaling. More specifically, as described elsewhere herein, software executing on the processor 102 (or another processor) places kernel dispatch packets 302 into a software queue and notifies the APD 116 (e.g., through the driver 122) that such kernel dispatch packets 302 are ready for execution. Since the chiplets 201 themselves divide the workgroups of each kernel dispatch packet 302, the software can be written as if only a single actor—the APD 116 is processing the kernel dispatch packets 302 of the software command queues.

The chiplets 201 are capable of dividing the workgroups 306 in any technically reasonable manner. In an example, the chiplets 201 are each pre-configured to execute certain workgroup numbers. In another example, chiplets 201 are configured to assign workgroups in a round robin manner. In another example, chiplets 201 are configured to assign workgroups in sets of multiple workgroups that are contiguous by workgroup number. It should be understood that a workgroup 306 of a kernel dispatch have workgroup identifiers which are also referred to as workgroup number herein. In other examples, any other technically feasible manner for dividing the workgroups 306 between the chiplets 201 are possible.

In the example illustrated in FIG. 3, a kernel dispatch 303 (which represents the execution of the kernel dispatch packet 302) includes a number of workgroups 306. These manner in which workgroups 306 are divided between the chiplets 201 is illustrated with the workgroup sets 304. There are three such workgroups sets 304. Workgroup set 1 304(1) includes workgroups 306(1)-306(N). Workgroup set 2 304(2) includes workgroups 306(N+1)-306(2N). Workgroup set 3 304(3) includes workgroups 306(2N+1)-306(3N). Workgroup set 1 304(1) is assigned to chiplet 1 201(1). Workgroup set 2 304(2) is assigned to chiplet 2 201(2). Workgroup set 3 304(3) is assigned to chiplet 3 201(3). Although shown divided in a certain way (e.g., equally between chiplets 201), it should be understood that any manner of dividing the workgroups 306 of a kernel dispatch 302 fall within the scope of the present disclosure.

As described, the chiplets 201 of the APD 116 cooperate to execute the multiple workgroups 306 of the kernel dispatch packets 302. Once a kernel dispatch packet 302 has completed, the APD 116 informs the entity that requested execution of the kernel dispatch packet 302 (the "client" e.g., the processor 102) that the kernel dispatch packet 302 has completed execution. In some examples, to perform this notification, a single chiplet 201 is designated as the client notifier 201. Each chiplet 201 informs the client notifier chiplet when the workgroups 306 assigned to that chiplet have been completed. When the client notifier chiplet 201 determines that all workgroups 306 have completed execution, the client notifier chiplet 201 notifies the client that the kernel dispatch packet 302 has been completed.

In some examples, the chiplets 201 synchronize execution of the kernel dispatch packets 302 in the hardware command queues 137. In examples, this synchronization occurs in the following manner. When a chiplet 201 completes execution of all workgroups 306 for a kernel dispatch packet 302, the chiplet 201 notifies all other chiplets 201 participating in the synchronization of this completion. In some examples, no chiplet 201 proceeds to a subsequent kernel dispatch packet 302 until all chiplets participating in the synchronization have received an indication from all other chiplets participating in the synchronization that all such chiplets 201 have completed execution of the workgroups 306 for the current kernel dispatch packet 302. In some implementations, some chiplets 201 are permitted to proceed past the "current" kernel dispatch packet 302 without receiving a notification from other chiplets 201 that the workgroups 306 for those other chiplets 201 are complete. In some such implementations, at least some chiplets 201 do wait for all other chiplets 201 to complete all workgroups 306 for a particular kernel dispatch packet 302 before proceeding to a subsequent kernel dispatch packet 302.

In some examples, the synchronization described above occurs via a counter mechanism. According to the counter mechanism, each chiplet 201 maintains a counter. When a group of chiplets 201 starts processing a new software command queue, the group of chiplets 201 resets this counter. Each time a chiplet 201 completes processing for a kernel dispatch packet 302, the chiplet 201 increments its own counter and broadcasts the new value to each other chiplet 201. To synchronize operation, once a chiplet has completed processing for a kernel dispatch packet 302, the chiplet 201 waits until the counter value received from all other chiplets 201 is at least equal to the counter value of that chiplet 201. Once this occurs, the chiplet 201 proceeds to the subsequent kernel dispatch packet 302.

In implementations where the counter is used, the notifier chiplet 201 notifies the client of completion of the kernel dispatch packet 302 upon receiving a counter value corresponding to that kernel dispatch packet 302 from all other chiplets 201 participating in processing that kernel dispatch packet 302.

It is possible for a single APD 116 to include a number of chiplets 201 that are grouped into multiple groups to service different clients or different software command queues. Each such group of chiplets 201 "appears" to the client as a single APD 116. In other words, each such group of chiplets 201 coordinates together to execute the contents of software command queues, using the techniques described elsewhere herein of distributing the workgroups among the different chiplets 201. A single device including multiple chiplets 201 is thus capable of servicing many different clients. In addition, it is possible to combine multiple devices, each including one or more chiplets 201, to execute the contents of one or more software command queues utilizing the techniques described herein. Thus, a combination of such dies is capable of servicing one or more different clients, by grouping the chiplets 201 of those dies in any combination. In various examples, any technically feasible entity, such as an operating system or hypervisor, is the entity that assigns chiplets 201 to groups and groups to clients.

In some examples, each chiplet 201 has multiple hardware command queues 137. Each hardware command queue 137 is identified by an identification number. In some such examples, each chiplet 201 that is part of a group assigns a given software command queue to a hardware command queue 137 having the same identification number. This operation simplifies the data required for communication regarding synchronization. More specifically, as described elsewhere herein, synchronization involves the chiplets 201 that are part of a group communicating upon completing execution of a particular kernel dispatch packet 302. By assigning software command queues to the same hardware command queue number, the communication does not need to explicitly indicate a software command queue identifier when communicating regarding such completion. An indication of the hardware command queue implicitly indicates which software command queue the synchronization communication is for. Thus in some implementations, the chiplets 201 communicate the hardware command queue 137 number along with the indications of completion of the kernel dispatch packets 302.

Figure 4:
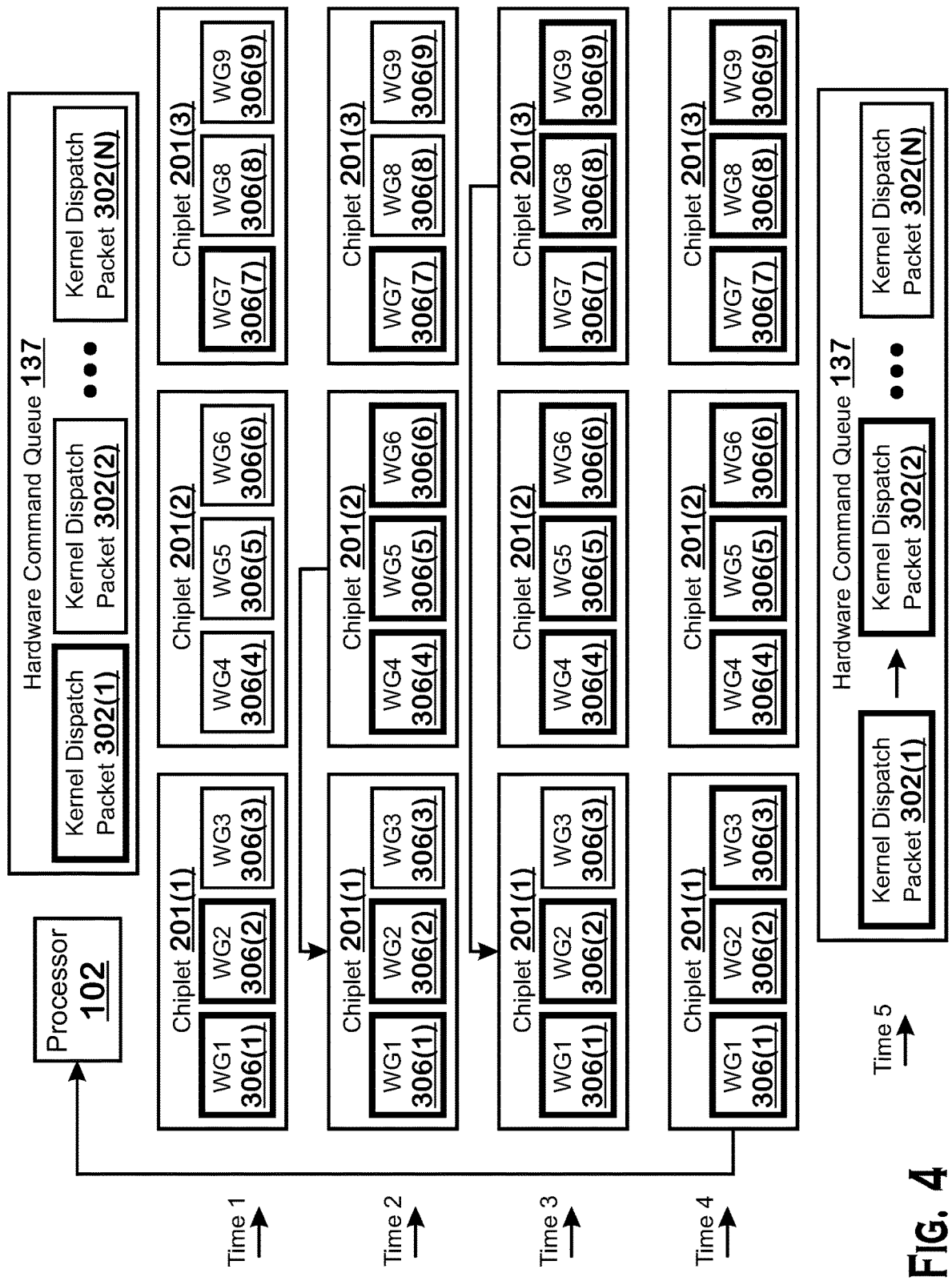
FIG. 4 is a block diagram illustrating an example set of operations for executing kernels cooperatively across chiplets.

FIG. 4 is a block diagram illustrating an example set of operations for executing kernels cooperatively across chiplets 201. The operations begin with a hardware command queue 137 having kernel dispatch packets 302(1)-302(N). It should be understood that this hardware command queue 137 represents the contents of the hardware command queues of the different chiplets 201 (i.e., chiplet 201(1), 201(2), and 201(3)). It should also be understood, however, that it is possible for the different chiplets 201 to not necessarily be storing identical contents at any given point in time. For example, it is possible for different chiplets 201 to have different-sized hardware command queues 137, or to store different portions of the software command queues that "back" the hardware command queues 137 at any given point in time. It should be understood, however, that FIG. 4 illustrates cooperation to execute the contents of the same software command queue.

The operations illustrated in FIG. 4 begin with the hardware command queue 137 storing the kernel dispatch packets 302 as shown. It should be understood that processor 102 has already written these kernel dispatch packets 302 into a corresponding software command queue, which has caused the chiplets 201 to load the kernel dispatch packets 302 illustrated into their respective hardware command queues 137. It should also be understood that the hardware command queue 137 illustrated represents the contents of the hardware command queue 137 of each of the chiplets 201, although it should be understood that in operation, the contents of different such hardware command queues 137 may differ. In addition, FIG. 4 illustrates a sequence of points in time. These points of time illustrate progressive processing of work.

Kernel dispatch packet 302(1) includes workgroups 1-9. These workgroups 306 are assigned to the chiplets 201 as follows: chiplet 201(1) is assigned workgroups 1-3, chiplet 201(2) is assigned workgroups 4-6, and chiplet 201(3) is assigned workgroups 7-9. Prior to time 1, the chiplets 201 process workgroups of the kernel dispatch packet 302(1). At time 1, chiplet 1 201(1) has processed workgroups 306(1) and 306(2), chiplet 201(2) has not processed any workgroups, and chiplet 201(3) has processed workgroup 7 306(7). At this time, no chiplets 201 have completed their entire allotment of workgroups 306 from kernel dispatch packet 302(1).

At time 2, chiplet 201(2) completes processing of workgroup 4 306(4), workgroup 5 306(5), and workgroup 6 306(6). At this point, chiplet 201(2) has completed processing of all allocated workgroups 306 for kernel dispatch packet 302(1). Thus, chiplet 201(2) informs chiplet 201(1) and, in some implementations, chiplet 201(3) of the completion by chiplet 201(2) of the kernel dispatch packet 302(1). In the example of FIG. 4, chiplet 201(1) is the chiplet 201 that notifies the processor 102 of completion of kernel dispatch packets 302.

At time 3, chiplet 201(3) completes all workgroups 306 of kernel dispatch packet 302(1) and informs chiplet 201(1) and, in some implementations, chiplet 201(2), of such completion. At time 4, chiplet 201(1) completes all workgroups 306 of kernel dispatch packet 302(1). Chiplet 201(1) sends an indication to all other chiplets 201 that all chiplets 201 have completed all workgroups 306 for kernel dispatch packet 302(1). In addition, because all workgroups 306 for all chiplets 201 are completed for kernel dispatch packet 302(1), chiplet 201(1), the notification chiplet, notifies the client—the processor 102—that kernel dispatch packet 302 (1) is complete. At time 5, because the kernel dispatch packet 302(1) is complete, the chiplets 201 begin processing kernel dispatch packet 302(2). Note that at time 5, each chiplet 201 has knowledge that the kernel dispatch packet 302(1) is complete. In some examples, the chiplets 201 gain this knowledge because each chiplet 201 broadcasts to each other chiplet 201 when that chiplet 201 is completed with a kernel dispatch packet 302. Thus when a first chiplet 201 has received an indication from each other chiplet 201 that the chiplet 201 has completed processing of a kernel dispatch packet 302, the first chiplet 201 knows to proceed to a subsequent kernel dispatch packet 302.

Figure 5:
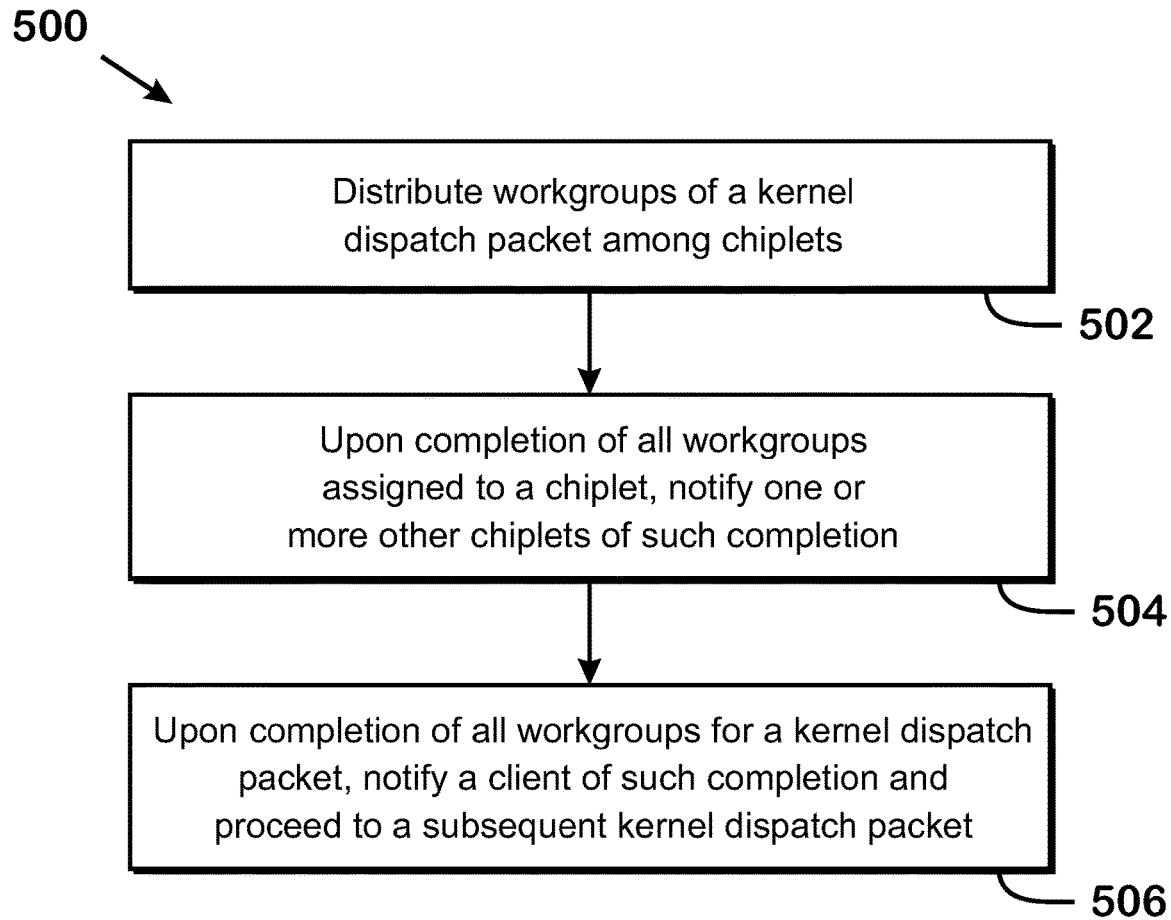
FIG. 5 is a flow diagram of a method for executing kernels across multiple chiplets, according to an example.

FIG. 5 is a flow diagram of a method 500 for executing kernels across multiple chiplets, according to an example. Although described with respect to the system of FIGS. 1-4, those of skill in the art will understand that any system, configured to perform the steps of FIG. 5 in any technically feasible order.

At step 502, a group of chiplets 201 distributes workgroups of a kernel dispatch packet among the chiplets 201. In various examples, each chiplet 201 has a command processor 136 that receives an indication from a client such as the processor 102 that kernel dispatch packets 302 have been added to a software command queue from which the chiplets 201 are executing kernel dispatch packets 302. Subsequently to this, the chiplets 201 load the added kernel dispatch packets 302 into hardware command queues 137 of the chiplets 201 that are associated with the software command queues. The chiplets 201 select a kernel dispatch packet 302 for execution from their respective hardware command queues 137. The chiplets 201 distribute the workgroups of these kernel dispatch packets 302 in any technically feasible manner. In an example, a command processor 136 of each chiplet 201 iterates through a list of all workgroups for a kernel dispatch packet 302 and ignores workgroup numbers that are not assigned to that chiplet 201. In various examples, distribution of workgroups to the chiplets 201 is based on a number referred to as a "workgroup chunk size," which indicates how many consecutively numbered workgroups to assign to a particular chiplet 201, as well as the chiplet ID 201 of a particular chiplet 201. In an example, the chiplets 201 are each pre-designated different numbered sets of these workgroups. In one example, the workgroups are assigned to different chiplets 201 in a round robin manner, by workgroup identifier. For example, if there are three chiplets 201, then a first chiplet 201 would get workgroups number 1, 4, 7, and so on, a second chiplet 201 would get workgroups number 2, 5, 8, and so on, and a third chiplet 201 would get workgroups number 3, 6, 9, and so on. In other examples, the chiplets 201 communicate during runtime to determine which workgroups 306 are assigned to which chiplets 201. Again, any technically feasible manner for subdividing the workgroups 306 is possible. The "distribution" of step 502 refers to the operations of, for any given chiplet 201, identifying which workgroups to execute.

At step 504, a chiplet 201 completes execution of the workgroups assigned to that chiplet 201 for a given kernel dispatch packet 302 and notifies one or more other chiplets of such completion. In one example, such notification includes a broadcast of a counter that counts the number of kernel dispatch packets 302 completed. In other words, each time a chiplet 201 completes all workgroups assigned to that chiplet 201 for a given kernel dispatch packet 302, the chiplet 201 increments a counter and broadcasts that counter to the other chiplets 201. This counter identifies the location in the hardware command queue 137 that the chiplet 201 is at. The broadcast of this counter value acts as a notification to the other chiplets 201 that the broadcasting chiplet 201 has completed a kernel dispatch packet 302.

At step 506, upon completion of all workgroups by all chiplets 201 of a kernel dispatch packet 201, a notifier chiplet 201 notifies the client (e.g., processor 102) of such completion. In some examples, a single chiplet 201, out of the group of chiplets 201 cooperating to execute the contents of a software command queue, is designated as the notifier chiplet 201. When the notifier chiplet 201 determines that all chiplets 201 have completed the workgroups for a given kernel dispatch packet 302, the notifier chiplet 201 notifies the client of such completion. In some examples, this determination is made by the notifier chiplet determining that the notifier chiplet 201 has received a counter value corresponding to the given kernel dispatch packet 302 from each other chiplet 201 participating in the execution of that kernel dispatch packet 302. In addition, each chiplet 201, upon determining that each other participating chiplet 201 has completed the kernel dispatch packet 302, proceeds to the next kernel dispatch packet 201. Again, this determination is, in some examples, made by determining that the chiplet 201 has received a counter value corresponding to the kernel dispatch packet 302 at issue.

In various examples, each chiplet 201 that is participating in the execution of a kernel dispatch packet 302 has a command processor 136 and this command processor performs the steps of the method 500 for each chiplet 201.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the command processor 136, the graphics processing pipeline 134, the compute units 132, the SIMD units 138, or the hardware command queue 137, may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for executing computing work by a plurality of chiplets, the method comprising:
    assigning workgroups of a kernel dispatch packet to the chiplets;
    executing, by each chiplet, the workgroups assigned to that chiplet;
    upon completion of all workgroups assigned to a chiplet for the kernel dispatch packet, notifying, by the chiplet, each other chiplet of the plurality of chiplets executing the computing work, of such completion, the notifying comprising broadcasting an indication of progress; and
    upon completion of all workgroups of the kernel dispatch packet, notifying, by a command processor of a chiplet of the plurality of chiplets, a client of such completion and proceeding to a subsequent kernel dispatch packet by each chiplet of the plurality of chiplets.

2. The method of claim 1, wherein each chiplet is assigned a different mutually exclusive set of workgroups of the kernel dispatch packet.

3. The method of claim 1, wherein the workgroups assigned to each chiplet are assigned in a pre-designated manner.

4. The method of claim 1, wherein the indication of progress is an indication of progress through a hardware command queue.

5. The method of claim 1, wherein notifying the client is performed by one chiplet of the plurality of chiplets designated as a notifier chiplet.

6. The method of claim 1, wherein the kernel dispatch packet and the subsequent kernel dispatch packet are stored in a hardware command queue of each of the plurality of chiplets.

7. The method of claim 1, wherein assigning workgroups of a kernel dispatch packet to the chiplets and notifying the other chiplets of such completion are performed by a command processor of each chiplet of the plurality of chiplets.

8. The method of claim 1, further comprising determining that all workgroups of the kernel dispatch packet are completed by determining that a notification has been received from each chiplet of the plurality of chiplets, wherein the notification indicates that a chiplet has completed all workgroups of the kernel dispatch packet.

9. A chiplet, comprising:
a compute unit configured to execute workgroups; and
a command processor configured to:
identify workgroups of a kernel dispatch packet assigned to the chiplet;
cause the compute unit to execute the workgroups assigned to the chiplet;
upon completion of all workgroups assigned to the chiplet for the kernel dispatch packet, notify by the chiplet, each other chiplet of a plurality of chiplets executing computing work of such completion, the notifying comprising broadcasting an indication of progress; and
upon completion of all workgroups assigned to all chiplets of the plurality of chiplets for the kernel dispatch packet, notify a client of such completion and proceed to processing workgroups of a subsequent kernel dispatch packet.

10. The chiplet of claim 9, wherein each chiplet of the plurality of chiplets is assigned a different mutually exclusive set of workgroups of the kernel dispatch packet.

11. The chiplet of claim 9, wherein the workgroups assigned to each chiplet are assigned in a pre-designated manner.

12. The chiplet of claim 9, wherein the indication of progress is an indication of progress through a hardware command queue.

13. The chiplet of claim 9, further comprising:
a hardware command queue configured to store the kernel dispatch packet and the subsequent kernel dispatch packet.

14. The chiplet of claim 9, wherein the command processor is further configured to:
determine that all workgroups of the kernel dispatch packet are completed by determining that a notification has been received from each chiplet of the plurality of chiplets, wherein the notification indicates that a chiplet has completed all workgroups of the kernel dispatch packet.

15. A device comprising:
a plurality of chiplets, wherein each chiplet of the plurality of chiplets includes:
a compute unit configured to execute workgroups; and
a command processor configured to:
identify workgroups of a kernel dispatch packet assigned to the chiplet;
cause the compute unit to execute the workgroups assigned to the chiplet; and
upon completion of all workgroups assigned to the chiplet for the kernel dispatch packet, notify each other chiplet of the plurality of chiplets of such completion, the notifying comprising broadcasting an indication of progress,
wherein a chiplet of the plurality of chiplets is configured to, upon completion of all workgroups assigned to all chiplets of the plurality of chiplets for the kernel dispatch packet, notify a client of such completion and proceed to processing workgroups of a subsequent kernel dispatch packet by each chiplet of the plurality of chiplets.

16. The device of claim 15, wherein each chiplet of the plurality of chiplets is assigned a different mutually exclusive set of workgroups of the kernel dispatch packet.

17. The device of claim 15, wherein the workgroups assigned to each chiplet are assigned in a pre-designated manner.

* * * * *